(12) United States Patent
Hettinger et al.

(10) Patent No.: US 12,326,171 B2
(45) Date of Patent: Jun. 10, 2025

(54) JOURNAL FOIL BEARING SYSTEM WITH TOP FOIL INSERT MEMBER

(71) Applicant: Garrett Transportation I Inc., Torrance, CA (US)

(72) Inventors: Raphael Hettinger, La Baffe (FR); Romain Guillot, Thaon les Vosges (FR); Alexandre Wirtzler, Thaon les Vosges (FR); Scott Aguilar, La Crescenta, CA (US); Cedric Karwat, Nancy (FR)

(73) Assignee: GARRETT TRANSPORTATION I INC., Torrance, CA (US)

(*) Notice: Subject to any disclaimer, the term of this patent is extended or adjusted under 35 U.S.C. 154(b) by 181 days.

(21) Appl. No.: 18/174,735

(22) Filed: Feb. 27, 2023

(65) Prior Publication Data

US 2024/0288032 A1 Aug. 29, 2024

(51) Int. Cl.
*F16C 17/02* (2006.01)

(52) U.S. Cl.
CPC ........ *F16C 17/024* (2013.01); *F16C 2226/36* (2013.01); *F16C 2226/40* (2013.01)

(58) Field of Classification Search
CPC .................................................... F16C 17/024
See application file for complete search history.

(56) References Cited

U.S. PATENT DOCUMENTS

| 5,634,723 | A | 6/1997 | Agrawal |
| 6,964,522 | B2 | 11/2005 | Kang et al. |
| 7,494,282 | B2 * | 2/2009 | Lee ........................ F16C 27/02 384/106 |
| 8,353,631 | B2 | 1/2013 | Kim |
| 8,371,799 | B2 | 2/2013 | Spathias et al. |
| 9,057,401 | B2 | 6/2015 | Saville et al. |
| 9,109,622 | B2 | 8/2015 | Meacham et al. |
| 9,556,899 | B2 | 1/2017 | Saville et al. |
| 9,568,042 | B2 | 2/2017 | Omori |
| 9,989,085 | B2 | 6/2018 | Saville et al. |
| 2007/0047858 | A1 | 3/2007 | Hurley et al. |

(Continued)

FOREIGN PATENT DOCUMENTS

| CN | 111795062 A | 10/2020 | |
| CN | 112943789 A * | 6/2021 | ............ F16C 17/024 |

(Continued)

OTHER PUBLICATIONS

Translation of CN-112943789 obtained Oct. 22, 2024.*

*Primary Examiner* — James Pilkington
(74) *Attorney, Agent, or Firm* — LORENZ & KOPF, LLP (57) ABSTRACT

A foil bearing system includes a journal member with an internal groove and a foil arrangement. The foil arrangement includes at least one biasing foil and a top foil insert member. The at least one biasing foil is received between the journal member and the shaft in a radial direction with respect to the axis. The top foil insert member includes a top foil and a spine insert. The top foil includes an arcuate portion that is disposed between the at least one biasing foil and the shaft in the radial direction and that extends in a circumferential direction about the axis. The top foil includes an end that extends from the arcuate portion. The spine insert is received within the internal groove, and the spine insert is fixedly attached to the end of the top foil.

19 Claims, 5 Drawing Sheets

(56) References Cited

U.S. PATENT DOCUMENTS

2011/0052110 A1   3/2011  Kim
2022/0325745 A1  10/2022  Aguilar et al.
2022/0333638 A1  10/2022  Tabacchi et al.

FOREIGN PATENT DOCUMENTS

EP         2942537 A1   11/2015
EP         2949952 A1   12/2015
KR      20210115228 A    9/2021

* cited by examiner

JOURNAL FOIL BEARING SYSTEM WITH TOP FOIL INSERT MEMBER

TECHNICAL FIELD

The present disclosure generally relates to bearing systems and, more particularly, relates to a journal foil bearing system with a top foil insert member.

BACKGROUND

Various bearing systems are provided for supporting rotation of a shaft within a housing. For example, turbomachines (e.g., turbochargers, superchargers, and other compressor devices) may include one or more air bearings. These bearings preferably support efficient rotation of the shaft, across a wide range of operating conditions, and throughout a long operating lifetime.

Some devices include foil bearing systems (i.e., journal foil bearing systems, foil-air bearing systems, air foil journal bearing, etc.). These bearings include one or more foils that are radially disposed between the shaft and the housing, wherein the foil(s) exert an inwardly directed radial pre-load against the shaft when at-rest. The lift-off speed of the bearing is affected by the amount of pre-load applied to the shaft. Furthermore, wear of the bearing is affected by the amount of applied pre-load. Also, the foil(s) are preferably stiff enough to provide acceptable roto-dynamic behavior/shaft motion control throughout the operating speed range of the shaft.

However, tailoring and controlling these factors for conventional foil bearing systems remains challenging. For example, it can be difficult to control certain dimensions of the bearing components, which can cause the pre-load of the foil bearing to be unacceptable. Manufacture of these bearing systems can also be inefficient for a variety of reasons. For example, it may be labor-and/or energy-intensive to form, assemble, and/or control the dimensions of the bearing components. Additionally, there may be a large part count, complex parts, etc. This may increase costs and make handling and assembly more difficult.

Thus, it is desirable to provide a foil bearing system that allows for precise and selective control of the bearing support loads, the lift-off speed of the foil bearing system, and/or other characteristics of the bearing system. It is also desirable to provide a foil bearing system that provides manufacturing and assembly efficiencies. Other desirable features and characteristics of the present disclosure will become apparent from the subsequent detailed description and the appended claims, taken in conjunction with the accompanying drawings and this background discussion.

BRIEF SUMMARY

In one embodiment, a foil bearing system is disclosed that includes a journal member with a bore and an internal groove within the bore. The foil bearing system also includes a shaft that is received within the bore. The foil bearing system further includes a foil arrangement that supports the shaft for rotation relative to the journal member about an axis. The internal groove extends substantially along the axis. The foil arrangement includes at least one biasing foil and a top foil insert member. The at least one biasing foil is received between the journal member and the shaft in a radial direction with respect to the axis. The top foil insert member includes a top foil and a spine insert. The top foil includes an arcuate portion that is disposed between the at least one biasing foil and the shaft in the radial direction and that extends in a circumferential direction about the axis. The top foil includes an end that extends from the arcuate portion. The spine insert is received within the internal groove, and the spine insert is fixedly attached to the end of the top foil.

In another embodiment, a method of manufacturing a foil bearing system is disclosed that includes providing a journal member with a bore and an internal groove within the bore. The method also includes disposing a shaft within the bore. Also, the method includes supporting, with a foil arrangement, the shaft for rotation relative to the journal member about an axis, the internal groove extending substantially along the axis, the foil arrangement including at least one biasing foil and a top foil insert member. The top foil insert member includes a top foil and a spine insert that is fixedly attached thereto. The method also includes disposing the at least one biasing foil between the journal member and the shaft in a radial direction with respect to the axis. Also, the method includes disposing an arcuate portion of the top foil between the at least one biasing foil and the shaft in the radial direction, the arcuate portion extending in a circumferential direction about the axis, the top foil including an end that extends from the arcuate portion. Moreover, the method includes disposing the spine insert within the internal groove, the spine insert fixedly attached to the end of the top foil.

In an additional embodiment, a foil bearing system is disclosed. The foil bearing system includes a journal member with a bore and an internal groove within the bore. The foil bearing system also includes a shaft received within the bore and a foil arrangement that supports the shaft for rotation relative to the journal member about an axis. The internal groove extends substantially along the axis, and the foil arrangement includes at least one biasing foil and a top foil insert member. The at least one biasing foil is received between the journal member and the shaft in a radial direction with respect to the axis. The top foil insert member includes a top foil and a spine insert. The top foil includes an arcuate portion, a first end, and a second end. The arcuate portion extends between the first end and the second end, and the arcuate portion is disposed between the at least one biasing foil and the shaft in the radial direction and extending in a circumferential direction about the axis. The first end and the second end extend radially from the arcuate portion. The spine insert includes a divider body that is disposed between the end and the other end and that separates the end and the other end, and the spine insert includes an abutment member that extends from the divider body. The spine insert is received within the internal groove with the abutment member configured to abut an inner surface of the groove. The spine insert is fixedly attached to the first end of the top foil, and the second end is detached from the spine insert.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved foil bearing system. The foil bearing system has a robust construction. The bearing characteristics (e.g., stiffness, dimensions, spring-bias loads, etc.) can be controlled with precision. The bearing system also includes features that increase manufacturing efficiency. The part count is relatively low. Also, the bearing system is relatively compact. Manufacture and assembly of the journal foil bearing system may be performed efficiently, accurately, and repeatably. These and other advantages are discussed herein.

In some embodiments, the foil bearing system includes at least one biasing foil and a top foil insert member. The top foil insert member may include at least one top foil that wraps at least partly about a shaft segment and a spine insert that supports the at least one top foil. The at least one top foil may be fixedly attached at one end to the spine insert. The spine insert may include a divider body that separates the attached end of the top foil from another end. This presents a number of advantages. For example, this configuration of the top foil insert member provides robust support to the biasing foil(s), shaft, etc. Pressure on the shaft from the top foil is controlled according to the dimensions of the spine. Thus, these preconstraints may be selected and controlled to tailor the bearing system. The top foil compresses the spring foil during operation and grows in the radial direction thereby generating radial displacement of the spring foil and reducing the pressure transferred to the shaft. The spring characteristics of the top foil may be controlled with precision according to one or more dimensions of the divider body of the spine insert.

Additionally, the spine insert may be received in a groove formed in the journal member of the bearing housing. The groove may be conveniently manufactured with precision. Abutment between the spine insert and the internal surfaces of the groove may robustly retain the top foil insert member within the assembly.

Moreover, the top foil insert member may improve handling for a variety of manufacturing and assembly advantages. The top foil insert member, with the top foil fixedly attached to the spine insert, may be handled as one unitary part, for example, to conveniently position the spine insert within the groove of the bearing housing. This configuration may also make replacement and repair of the bearing system more convenient.

Figure 1:
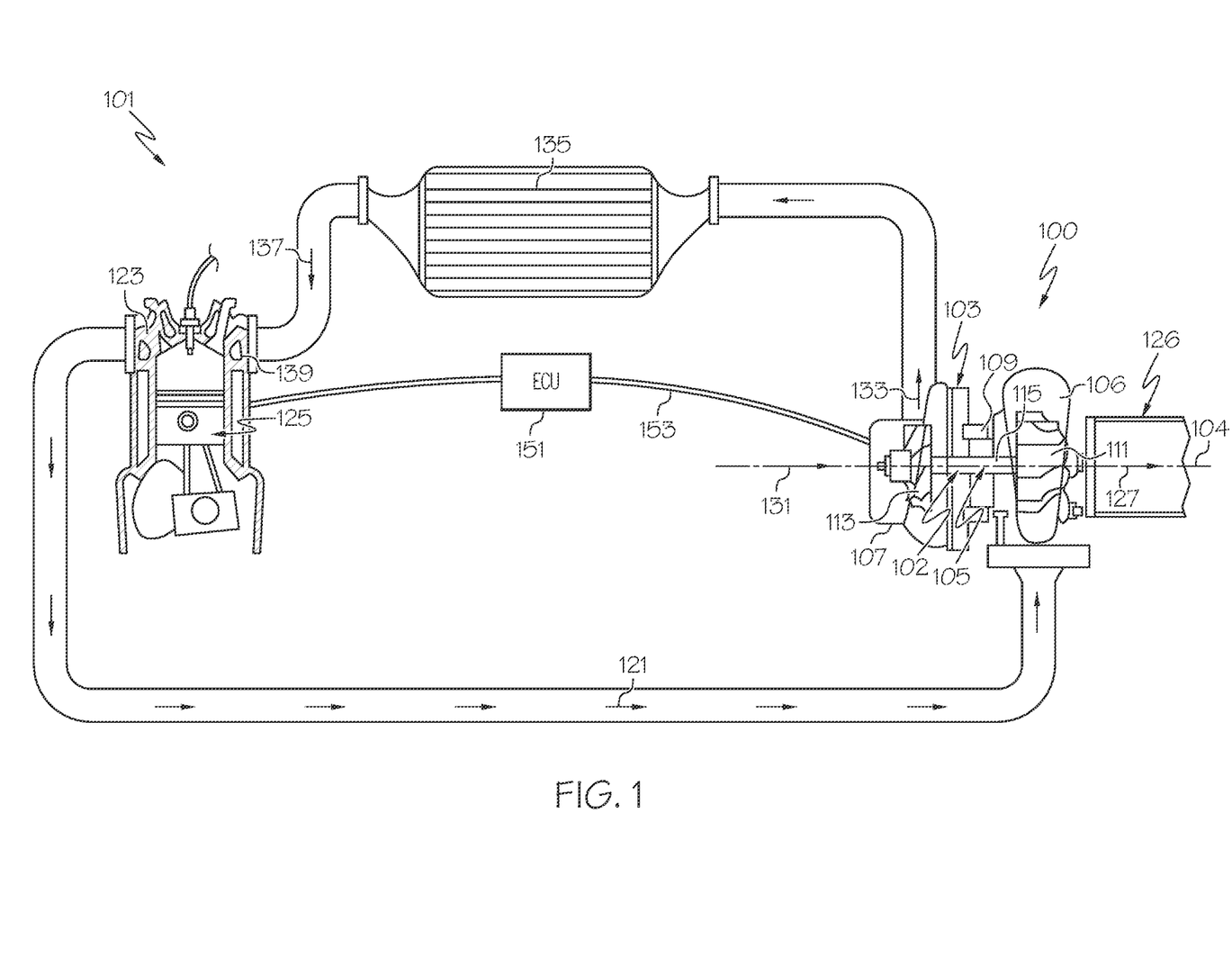
FIG. 1 is a schematic illustration of an engine system with a turbomachine that includes a foil bearing system according to example embodiments of the present disclosure.

FIG. 1 is a schematic view of an example turbomachine, such as a turbocharger 100 that is incorporated within an engine system 101. The turbocharger 100 may include one or more features of the present disclosure. It will be appreciated that the turbocharger 100 could be another turbomachine, such as a supercharger, a compressor device, an electric-motor-driven turbomachine, etc. in various embodiments of the present disclosure. Furthermore, the turbomachine of the present disclosure may be incorporated into a number of systems other than an engine system without departing from the scope of the present disclosure.

The turbocharger 100 may include a housing 103 and a rotating group 102, which is supported within the housing 103 for rotation about an axis 104 by a bearing system 105. The bearing system 105 may include and/or define at least one air journal foil bearing as will be discussed.

As shown in the illustrated embodiment, the housing 103 may include a turbine housing 106, a compressor housing 107, and a bearing housing 109. The bearing housing 109 may be disposed between the turbine and compressor housings 106, 107.

Additionally, the rotating group 102 may include a turbine wheel 111, a compressor wheel 113, and a shaft 115. The turbine wheel 111 is located substantially within the turbine housing 106. The compressor wheel 113 is located substantially within the compressor housing 107. The shaft 115 extends along the axis of rotation 104, through the bearing housing 109, to connect the turbine wheel 111 to the compressor wheel 113. Accordingly, the turbine wheel 111 and the compressor wheel 113 rotate together as a unit about the axis 104.

The turbine housing 106 and the turbine wheel 111 cooperate to form a turbine (i.e., turbine section, turbine stage) configured to circumferentially receive a high-pressure and high-temperature exhaust gas stream 121 from an engine, e.g., from an exhaust manifold 123 of an internal combustion engine 125. The turbine wheel 111 and, thus, the other components of the rotating group 102 are driven in rotation around the axis 104 by the high-pressure and high-temperature exhaust gas stream 121, which becomes a lower-pressure and lower-temperature exhaust gas stream 127 that is released into a downstream exhaust pipe 126.

The compressor housing 107 and compressor wheel 113 form a compressor (i.e., compressor section, compressor stage). The compressor wheel 113, being driven in rotation by the exhaust-gas driven turbine wheel 111, is configured to compress received input air 131 (e.g., ambient air, or already-pressurized air from a previous-stage in a multistage compressor) into a pressurized airstream 133 that is ejected circumferentially from the compressor housing 107. The compressor housing 107 may have a shape (e.g., a volute shape or otherwise) configured to direct and pressurize the air blown from the compressor wheel 113. Due to the compression process, the pressurized air stream is characterized by an increased temperature, over that of the input air 131.

The pressurized airstream 133 may be channeled through an air cooler 135 (i.e., intercooler), such as a convectively cooled charge air cooler. The air cooler 135 may be configured to dissipate heat from the pressurized airstream 133, increasing its density. The resulting cooled and pressurized output airstream 137 is channeled into an intake manifold 139 of the internal combustion engine 125, or alternatively, into a subsequent-stage, in-series compressor. The operation of the system may be controlled by an ECU 151 (engine control unit) that connects to the remainder of the system via communication connections 153.

The bearing system 105 may provide robust performance. The bearing system 105 may also provide manufacturing and other advantages that will be discussed. The bearing system 105 of the present disclosure may be configured for the turbocharger 100 as shown in FIG. 1; however, those having ordinary skill in the art will understand that the bearing system 105 of the present disclosure may be configured for other systems having a rotating shaft (e.g., electric generator, steam engine, gas turbine engine, and other turbomachines) without departing from the scope of the present disclosure.

Figure 2:
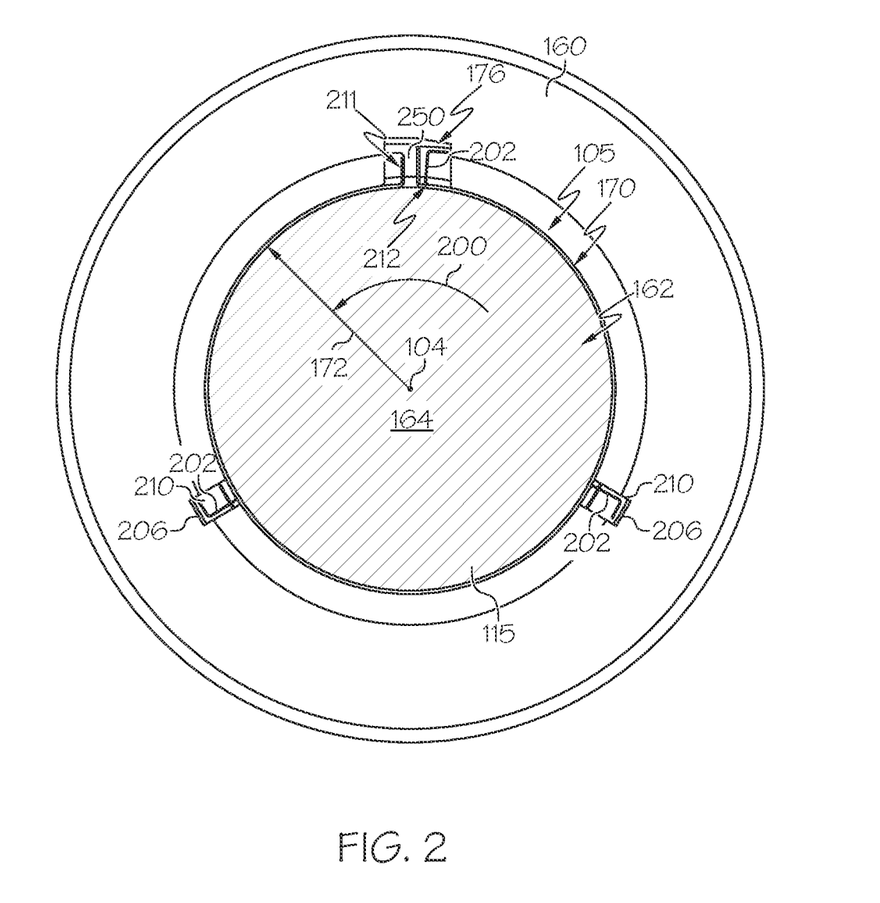
FIG. 2 is an axial end view of the turbomachine of FIG. 1 according to example embodiments with portions hidden to show an example foil bearing system of the turbomachine.
Figure 3:
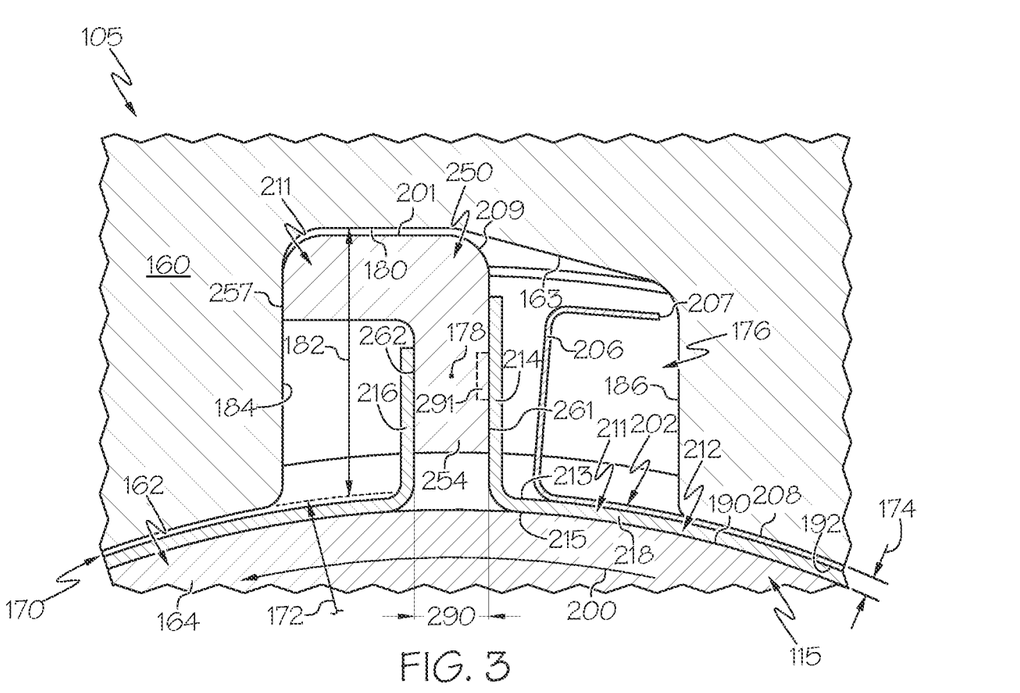
FIG. 3 is a detail end view of the foil bearing system of FIG. 2.

Referring now to FIGS. 2 and 3, the bearing system 105 of the present disclosure will be discussed in greater detail according to example embodiments. As shown, the bearing system 105 may be configured as a journal foil bearing system. The bearing system 105 may generally include a journal member 160 with a bore 162 that receives a segment 164 of the shaft 115. The bearing system 105 may also generally include a foil arrangement 170 disposed radially between the journal member 160 and the segment 164 of the shaft 115. Accordingly, the foil arrangement 170 may support the shaft 115 for rotation relative to the journal member 160 about the axis 104 as will be discussed. The foil arrangement 170 may be configured in a variety of ways (e.g., with bump-type foil spring, a leaf-type foil spring, etc.) without departing from the scope of the present disclosure.

The shaft segment 164 may have a circular cross section. The shaft segment 164 may include an outer diameter surface 190 (FIG. 3) that is smooth and centered about the axis 104 (FIG. 1). The shaft segment 164 may be supported for rotation in the counter-clockwise direction (as indicated by arrow 200) in the perspective of FIGS. 2 and 3.

The journal member 160, in some embodiments, may be fixed relative to (e.g., attached to) a surrounding portion of the bearing housing 109 (FIG. 1). The journal member 160 may be integrally attached to another portion of the bearing housing 109. The journal member 160 may be an inner area of the bearing housing 109 with the bore 162 extending therethrough. The bore 162 may have an inner radial surface 192 with a circular cross section and having a radius 172 (measured from the axis 104 to the inner radial surface 192). The radius 172 may be slightly larger than that of the segment 164 of the shaft 115. Accordingly, an annular gap 174 may be defined between the outer radial surface 190 of the shaft 115 and the inner radial surface 192 of the journal member 160. The gap 174 may receive the foil arrangement 170. The gap 174 may be dimensioned according to the size, spring stiffness, and/or other characteristics provided by the foil arrangement 170.

The journal member 160 may also include an internal groove 176 (i.e., a first internal groove). The groove 176 may be elongate and may extend along the axis of rotation 104 of the shaft 115, and the groove 176 may be recessed into the inner diameter surface 192 of the bore 162. In some embodiments, the groove 176 may have a longitudinal axis 178 that is substantially parallel to the axis of rotation 104 (FIG. 1).

FIG. 3 shows an example cross sectional profile of the groove 176 (taken normal to the groove axis 178). The cross sectional profile may be defined by a plurality of internal surfaces, some of which may be smooth and flat. The cross sectional profile may include at least three flat interior sides that extend along the longitudinal axis 178. In some embodiments, interior edges may be rounded. The cross sectional profile may remain substantially constant along a majority of the length of the journal member 160. In some embodiments, the cross sectional profile of the groove 176 may remain constant along the length of the journal member 160.

In some embodiments, the groove 176 may be defined by a substantially flat recessed surface 180 that may be disposed substantially parallel to a tangential plane of the inner radial surface 192. The recessed surface 180 may define a depth dimension 182 of the groove 176 (e.g., measured as the difference between the radii of the inner diameter surface 192 and the recessed surface 180). The groove 176 may also be defined by a substantially flat first side surface 184 and a substantially flat second side surface 186. The first and second side surfaces 184, 186 may extend substantially radially in a depth direction of the groove 176. The first side surface 184 may extend radially between the inner radial surface 192 and the recessed surface 180. The second side surface 186 may extend radially from the inner radial surface 192, and a ramp surface 163 may extend from the second side surface 186 to the recessed surface 180.

It will be appreciated that the groove 176 may be highly convenient to make and manufacture. The groove 176 may be machined easily within the bore 162. For example, in some embodiments, the groove 176 may be machined with a broaching tool. There may be a high degree of space and access to form the bore 162. Also, the flat surfaces 180, 184, 186, 163 of the groove 176 can be formed relatively easily and also machined to high tolerances.

As shown in FIG. 2, the journal member 160 may include one or more second grooves 210. As shown, there may be two second grooves 210, and the second grooves may be spaced angularly about the axis 104 from the groove 176 (e.g., spaced approximately 120° apart). The second grooves 210 may have a different cross sectional profile from the groove 176. For example, the second grooves 210 may have substantially rectangular cross sectional profiles.

Figure 4:
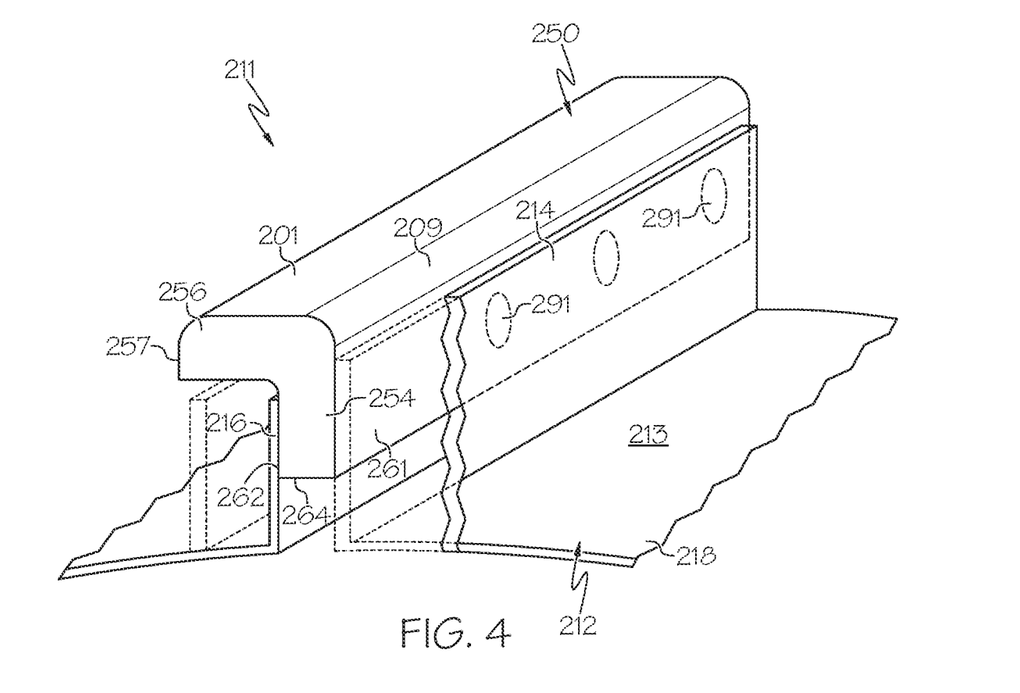
FIG. 4 is a perspective view of a top foil insert member of the foil bearing system of FIG. 2.

The foil arrangement 170 may include at least one biasing foil 202 (FIG. 3) and a top foil insert member 211 (FIGS. 3 and 4). The biasing foil(s) 202 may provide spring-biasing forces to the shaft segment 164 (e.g., by providing radially-directed biasing forces thereto). The top foil insert member 211 may cover over the shaft segment 164 and support flexure of the biasing foil(s) 202. The top foil insert member 211 may also be partly received within the internal groove 176. Also, portions of the biasing foil(s) 202 may be received in the internal groove 176, and other portions may be received within the second groove(s) 210. The foil arrangement 170 is shown in FIGS. 2 and 3 in a state in which the shaft 115 is at rest. Portions of the foil arrangement 170 contact the shaft 115 to support the shaft 115. However, once the shaft 115 is rotating fast enough, the working fluid (e.g., air) may push against and resiliently flex the foil arrangement 170 away from the shaft 115 to support its rotation.

The biasing foil 202 (i.e., spring foil, spring foil arrangement, etc.) may include at least one flexible and resilient thin sheet or foil that extends arcuately within the gap 174. There may be a plurality of thin sheets or foils that are arranged end-to-end about the axis 104. As shown in FIG. 2, there may be three biasing foils 202 spaced equally about the axis 104. A portion of one exemplary biasing foil 202 is shown in FIG. 3. As shown, the biasing foil 202 may include an arcuate portion 208 that extends in a circumferential direction and is radially disposed between the journal member 160 and the shaft segment 164. The biasing foil 202 may also include an end 206 that extends radially away from the arcuate portion 208 and away from the axis 104. A terminus 207 of the end 206 may be further turned outward in a tangential direction relative to a circle centered on the axis 104. The end 206 of the biasing foil 202 shown in FIG. 3 may extend radially outward to be received in the internal groove 176. The terminus 207 may oppose the side surface 186 of the groove 176. During operation, the terminus 207 may abut the surface 186 to limit rotation of the biasing foil 202. As shown in FIG. 2, the ends 206 of the other biasing foils 202 may be similarly received in the second grooves 210.

It will be appreciated that the biasing foils 202 may be configured in a number of shapes, sizes, dimensions, with different surface features, materials, and/or other arrangements for providing desirable bearing performance. The arcuate portions 208 may be rippled, corrugated, wavy, or otherwise patterned, in some embodiments to affect the flexibility and resilience of the foil arrangement 170.

The top foil insert member 211 is shown in FIGS. 2-4 according to example embodiments. In some embodiments, the top foil insert member 211 may generally include at least one top foil 212 and a spine insert 250.

In some embodiments, there may be a single arch-bound top foil 212 in the foil arrangement 170. The top foil 212 may be a thin sheet of material that extends about the axis 104. The top foil 212 may be partly annular with a first end 214, a second end 216, and an intermediate portion 218 that extends circumferentially between the first and second ends 214, 216. The intermediate portion 218 may be rounded and may follow a substantially circular path. The intermediate portion 218 may be radially disposed between the biasing foil(s) 202 and the outer radial surface 190 of the shaft segment 164. The biasing foil 202 may abut an outer radial side 213 of the top foil 212. An inner radial side 215 of the top foil 212 may layer over and abut against the outer radial surface 190 of the shaft segment 164. The first and second ends 214, 216 may project radially and may be received within the groove 176 of the journal member 160.

The spine insert 250 may be elongate with a straight longitudinal axis that extends along the longitudinal axis 178. The spine insert 250 may be rigid and strong. In some embodiments, the spine insert 250 may be made of metal. In additional embodiments, the spine insert 250 may be made of a polymeric material or a composite material. The spine insert 250 may be formed via extrusion, forging, machining, or other manner.

The spine insert 250 may have a variety of shapes, sizes, dimensions, etc. without departing from the scope of the present disclosure. In some embodiments, the spine insert 250 may have a plurality of smooth, flat surfaces and sides. The spine insert 250 may have an inverted L-shape or V-shape in a cross section taken normal to the axis of rotation 104 and the longitudinal axis 178. This cross section may remain substantially constant along a majority of the length of the spine insert 250 (i.e., along the axis 178). As such, the spine insert 250 may include a divider body 254 that extends radially and an abutment member 256 that extends transversely (e.g., tangentially) from the divider body 254. The divider body 254 may include a first side surface 261 and a second side surface 262. The first side surface 261 and the second side surface 262 may be substantially flat and may be parallel to each other, facing in opposite tangential directions away from each other. The divider body 254 may also define an inner radial edge 264 of the spine insert 250, which runs along the outer diameter surface 190 of the shaft segment 164, and which is spaced apart radially therefrom. The abutment member 256 may extend perpendicular to the divider body 254 and may terminate at an abutment surface 257.

The divider body 254 may be disposed between the first end 214 and the second end 216 of the top foil 212. The first end 214 of the top foil 212 may be layered flat upon and may abut the first side surface 261, and/or the second end 216 of the top foil 212 may be layered flat upon and may abut the second side surface 262 of the divider body 254. Thus, the divider body 254 may maintain the first and second ends 214, 216 spaced apart, at least, at a distance (e.g., a tangential distance 290) that is equal to the thickness of the divider body 254. The ends 214, 216 may be biased toward each other in the tangential and/or circumferential direction; however, the divider body 254 may push the first and second ends 214, 216 away from each against this biasing force. This load from the divider body 254 may cause the top foil 212 to be arch-bound within the foil arrangement 170.

Additionally, the first end 214 of the top foil 212 may be fixedly attached to the divider body 254 of the spine insert 250. The first end 214 may be fixedly attached in a variety of ways (e.g., welding, weldments, adhesive attachment, press fitting, crimping, etc.).

For example, as shown in FIG. 4, the first end 214 may be fixedly attached via welding to form a plurality of weldments 291 along the divider body 254. The weldments 291 may be spaced equally along the axis 178 to integrally attach the top foil 212 to the spine insert 250. As will be discussed, this configuration of the top foil insert member 211 (with the top foil 212 and spine insert 250 fixedly attached) allows for more convenient handling, manufacturing, etc.

The second end 216 of the top foil 212 may layer over the second side surface 262 at low rotational speeds of the shaft segment 164 as represented in FIGS. 3 and 4. However, the second end 216 may be detachably supported on the second side surface 262. During operation, the second side surface 262 and the second end 216 may move away from each other in the circumferential direction as represented in phantom in FIG. 4. As the speed of the shaft segment 164 reduces, the top foil 212 may resiliently recover such that the second end 216 comes to rest, layered back over the second side surface 262.

The spine insert 250 may be received within the internal groove 176. The divider body 254, the first end 214, and/or the second end 216 may be at least partly received in the groove 176. The abutment member 256 may extend tangentially within the groove 176 such that the abutment surface 257 is disposed in close proximity to the first side surface 184. Furthermore, the ramp surface 163 may be in close proximity with a rounded front edge 209 of the spine insert 250. An outer radial face 201 of the spine insert 250 may oppose the flat recessed surface 180 of the groove 176. This fit may permit manual insertion of the spine insert 250 within the groove 176. The fit of the spine insert 250 within the groove 176 may allow some shifting of the spine insert 250 therein, for example, during rotation of the shaft segment 164. However, the spine insert 250 may abut against the internal surfaces of the groove 176 to limit movement (e.g., limit rotation) of the top foil insert member 211 relative to the journal member 160.

It will be appreciated that, as shown in FIGS. 2 and 3, the spine insert 250 may have a single, solitary fit within the groove 176. In other words, the spine insert 250 may have a one-way fit within the groove 176 (i.e., with the abutment member 256 extending toward the side surface 184. If the spine insert 250 is inverted, for example, during assembly with the abutment member 256 extending toward the other side surface 186, it would become apparent that the spine insert 250 cannot fit within the groove 176. Thus, the asymmetry of the spine insert 250 and groove 176 and the one-way fit provided may be convenient during assembly of the foil bearing system 105.

As mentioned, the foil arrangement 170 shown in FIGS. 2 and 3 may represent a condition at which the shaft 115 is at-rest. The arch-bound top foil 212 may supply the selected radial pre-load to the shaft 115. As the shaft 115 begins to rotate (e.g., in the counter-clockwise direction along arrow 200), air pressure may cause the second end 216 (i.e., the leading end of the top foil 212) to lift away from the second side surface 262 while the first end 214 remains layered on the first side surface 261. As the angular velocity of the shaft 115 increases further, the top foil 212 may expand radially outward against the biasing force of the biasing foil 202 and lift-off the shaft 115 such that a thin film of air supports shaft rotation. As the shaft 115 decelerates, the biasing foil 202 and the top foil 212 may resiliently return to the state shown in FIG. 2.

Figure 5:
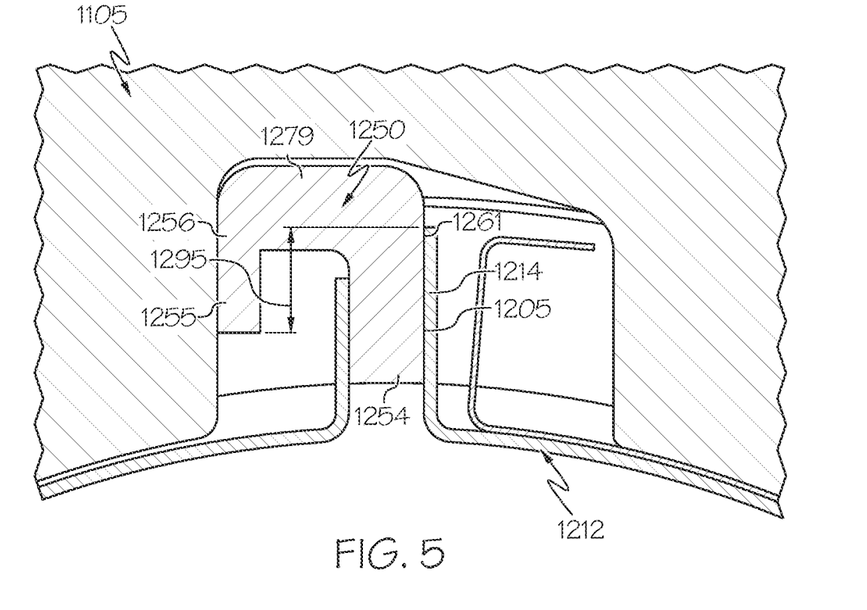
FIG. 5 is a detail end view of the foil bearing system according to additional embodiments of the present disclosure.

Referring now to FIG. 5, the foil bearing system 1105 is shown according to additional example embodiments. The foil bearing system 1105 may be substantially similar to the embodiments of FIGS. 2-4 except as noted. Features corresponding to those of FIGS. 2-4 are indicated with corresponding reference numbers increased by 1000.

In some embodiments, the first end 1214 of the top foil 1212 may be adhesively attached to the first surface 1261 of the spine insert 1250. An adhesive 1205 may be included between the first end 1214 and the first surface 1261 to fixedly attach the top foil 1212 to the spine insert 1250.

Also, the abutment member 1256 may include a turned edge 1255 and an intermediate portion 1279. The intermediate portion 1279 may extend tangentially between the divider body 1254 and the turned edge 1255. As the intermediate portion 1279 extends away from the divider body 1254, the abutment member 1256 may extend radially back inward at the turned edge 1255. The turned edge 1255 may extend a predetermined radial distance 1295 from the outer radial edge of the first end 1214. This distance 1295 may be controlled such that the spine insert 1250 has sufficient support against the side surface 1184 during operation.

Figure 6:
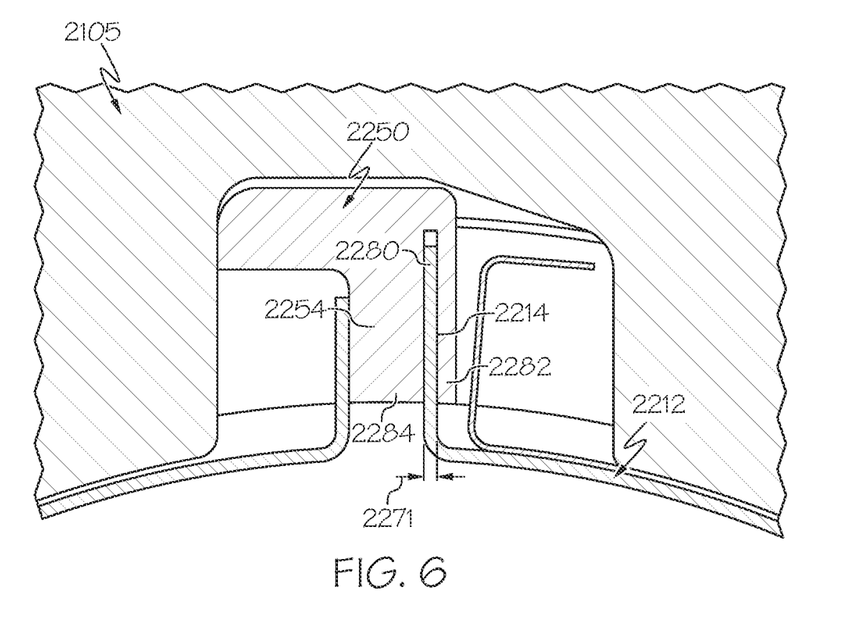
FIG. 6 is a detail end view of the foil bearing system according to additional embodiments of the present disclosure.
Figure 7:
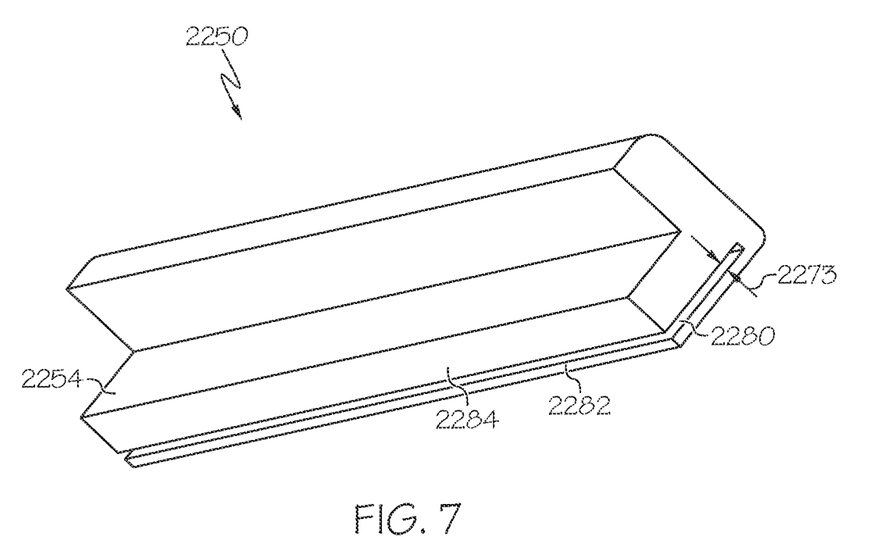
FIG. 7 is a perspective view of a spine insert of the foil bearing system of FIG. 6.

Referring now to FIGS. 6 and 7, the foil bearing system 2105 is shown according to additional example embodiments. The foil bearing system 2105 may be substantially similar to the embodiments of FIGS. 2-4 except as noted. Features corresponding to those of FIGS. 2-4 are indicated with corresponding reference numbers increased by 2000.

The spine insert 2250 may include an opening 2280. The opening 2280 may be a slot in the divider body 2254 that extends radially (FIG. 6). The opening 2280 may separate a first side 2282 of the divider body 2254 from a second side 2284 thereof. The opening 2280 may receive the first end 2214 of the top foil 2212, and the first end 2214 may be fixedly attached within the spine insert 2250. In some embodiments, the first side 2282 and/or second side 2284 may be plastically deformed against the first end 2214 to thereby crimp the first end 2214 within the opening 2280. In some embodiments, a thickness 2271 of the first end 2214 may be slightly larger than a width 2273 of the opening 2280, and the first end 2214 may be friction-fit or press-fit within the opening 2280.

The embodiments of the foil bearing system may provide various advantages. The embodiments may facilitate assembly of the foil bearing system. Furthermore, as detailed above, the various embodiments of the present disclosure allow for increased precision and control for the bearing loads. These systems also increase manufacturing efficiency.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A foil bearing system comprising:
   a journal member with a bore and an internal groove within the bore, the internal groove being defined by an internal surface;
   a shaft received within the bore;
   a foil arrangement that supports the shaft for rotation relative to the journal member about an axis, the internal groove extending substantially along the axis, the foil arrangement including at least one biasing foil and a top foil insert member;
   the at least one biasing foil being received between the journal member and the shaft in a radial direction with respect to the axis;
   the top foil insert member including a top foil and a spine insert;
   the top foil including an arcuate portion that is disposed between the at least one biasing foil and the shaft in the radial direction and that extends in a circumferential direction about the axis, the top foil including an end and another end that extend from the arcuate portion; and
   the spine insert received within the internal groove, the spine insert including a divider body that is disposed between the end and the other end to separate the end and the other end, the divider body of the spine insert being fixedly attached to the end of the top foil, the spine insert including an abutment member that extends from the divider body, the abutment member configured to abut against the internal surface.

2. The foil bearing system of claim 1, wherein the spine insert is fixedly attached to the end by a weldment.

3. The foil bearing system of claim 1, wherein the spine insert includes an opening, and wherein the end is received within the opening.

4. The foil bearing system of claim 1, wherein the spine insert is adhesively attached to the end.

5. The foil bearing system of claim 1, wherein the other end is detached from the divider body.

6. The foil bearing system of claim 1, wherein at least one of the end and the other end extends radially with respect to the axis.

7. The foil bearing system of claim 6, wherein both the end and the other end extend radially with respect to the axis.

8. The foil bearing system of claim 1, wherein the abutment member extends in a transverse direction relative to the divider body.

9. The foil bearing system of claim 8, wherein the abutment member includes a turned edge member; and
   wherein the abutment member includes an intermediate portion that extends in the transverse direction between the divider body and the turned edge member; and
   wherein the turned edge member is configured to abut against the internal surface.

10. The foil bearing system of claim 1, wherein the internal groove extends along a groove longitudinal axis; and wherein the spine insert is elongate and extends along the groove longitudinal axis and has a one-way fit within the internal groove.

11. A method of manufacturing a foil bearing system comprising:
providing a journal member with a bore and an internal groove within the bore, the internal groove being defined by an internal surface;
supporting, with a foil arrangement, a shaft for rotation within the bore relative to the journal member about an axis, the internal groove extending substantially along the axis, the foil arrangement including at least one biasing foil and a top foil insert member, the top foil insert member including a top foil and a spine insert, the top foil including an arcuate portion and an end and another end that extend from the arcuate portion, the spine insert including a divider body that is disposed between the end and the other end to separate the end and the other end, the divider body of the spine insert being fixedly attached to the end of the top foil, including:
disposing the at least one biasing foil between the journal member and the shaft in a radial direction with respect to the axis;
disposing the arcuate portion of the top foil between the at least one biasing foil and the shaft in the radial direction; and
disposing the spine insert within the internal groove.

12. The method of claim 11, further comprising welding the spine insert to the end of the top foil.

13. The method of claim 11, further comprising adhesively attaching the spine insert to the end of the top foil.

14. The method of claim 11, wherein the spine insert includes an opening, and wherein the end is received within the opening.

15. The method of claim 11, wherein the other end is detached from the divider body.

16. The method of claim 11, wherein the internal groove extends along a groove longitudinal axis; and
further comprising inserting the spine insert along the groove longitudinal axis with a one-way fit within the internal groove.

17. A foil bearing system comprising:
a journal member with a bore and an internal groove within the bore, the internal groove extending along a groove longitudinal axis;
a shaft received within the bore;
a foil arrangement that supports the shaft for rotation relative to the journal member about an axis, the internal groove extending substantially along the axis, the foil arrangement including at least one biasing foil and a top foil insert member;
the at least one biasing foil being received between the journal member and the shaft in a radial direction with respect to the axis;
the top foil insert member including a top foil and a spine insert;
the top foil including an arcuate portion that is disposed between the at least one biasing foil and the shaft in the radial direction and that extends in a circumferential direction about the axis, the top foil including an end that extends from the arcuate portion; and
the spine insert being elongate and received within the internal groove to extend along the groove longitudinal axis, the spine insert having a one-way fit within the internal groove, the spine insert fixedly attached to the end of the top foil.

18. The foil bearing system of claim 17, wherein the spine insert includes an opening, and wherein the end is received within the opening.

19. The foil bearing system of claim 17, wherein the top foil includes the end and another end, and wherein the other end is detached from the spine insert.

* * * * *